May 24, 1960 W. R. SKOW 2,937,885
SAFETY CHAIN DEVICES FOR TRACTOR HITCHES
Filed Feb. 6, 1959
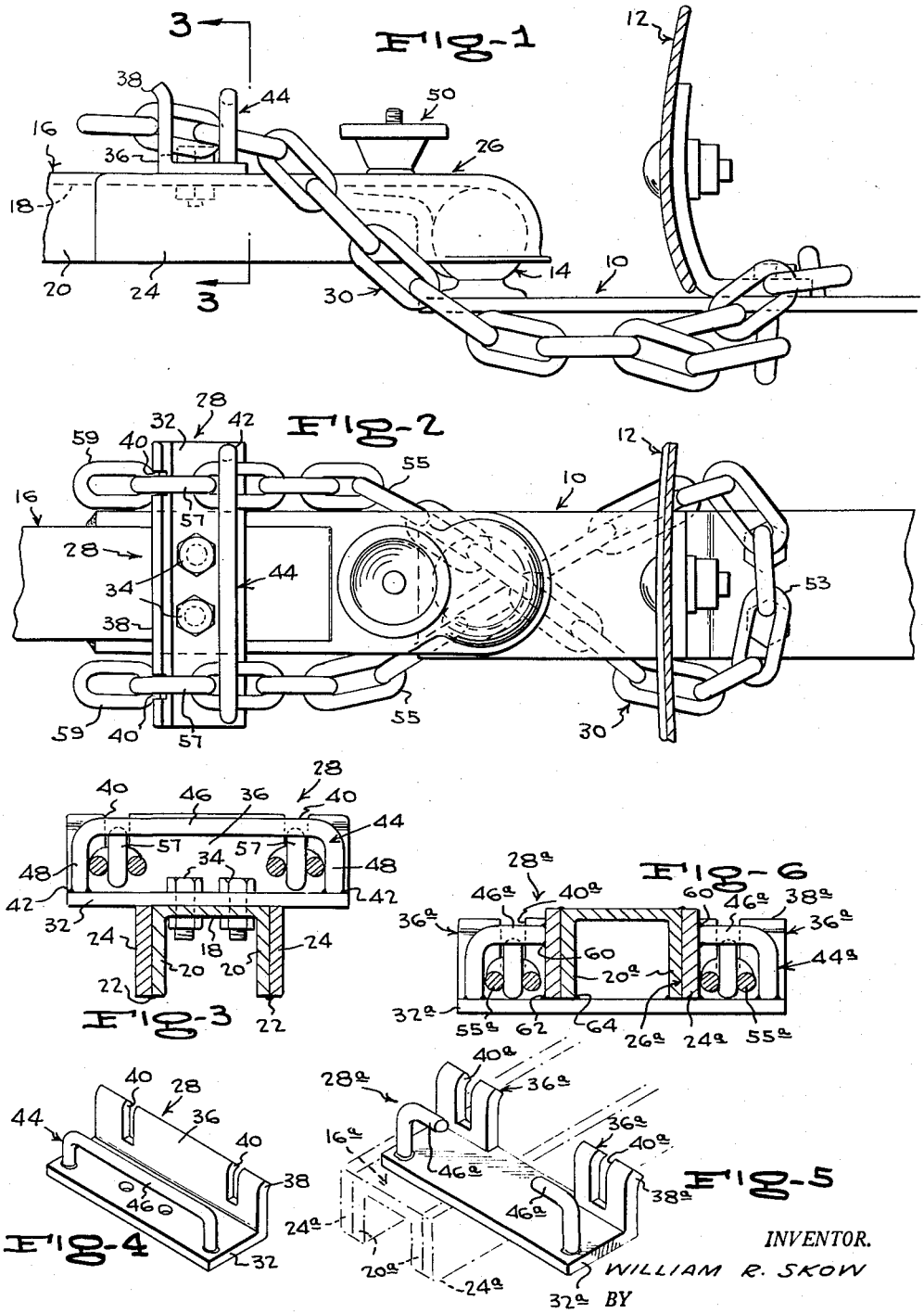
INVENTOR.
WILLIAM R. SKOW
BY
McMorrow, Berman & Davidson
ATTORNEYS

United States Patent Office 2,937,885
Patented May 24, 1960

2,937,885

SAFETY CHAIN DEVICES FOR TRACTOR HITCHES

William R. Skow, Rte. 1, Luck, Wis.

Filed Feb. 6, 1959, Serial No. 791,744

5 Claims. (Cl. 280—457)

This invention relates to improvements in trailer hitch safety devices for preventing disconnection of trailer vehicles from tractor vehicles whenever the components of the hitches involved become inadvertently or accidentally disconnected; and more particularly to novel and improved devices of this kind which involve chains and chain-locking brackets to be severally associated with drawbars of tractor vehicles and hitch tongues of trailer vehicles which are connected by hitch components.

The primary object of the invention is to provide inexpensive, efficient and easily installed safety devices of the character indicated above, which are simple in construction, and composed of a small number of uncomplicated parts, and which provide positive assurance against complete separation of trailer vehicles from tractor vehicles to which they are connected by conventional hitches, whenever, from any cause, the components of the hitches involved become disconnected and would otherwise permit separation of trailer vehicles from their tractor vehicles and accompanying damage and injury to vehicles and passengers, especially at high road speeds.

Another object of the invention is to provide safety devices of the character indicated above which are easily adapted to be installed on different types of trailer vehicle tongues and tractor vehicle drawbars, in conjunction with different forms of hitches.

Other important objects and advantageous features of the invention will be apparent from the following description and the accompanying drawings, wherein, for purposes of illustration only, a specific form of the invention is set forth in detail.

In the drawings:

Figure 1 is a fragmentary side elevation, partly in section, showing a safety device of the invention installed in association with a tractor vehicle drawbar, a trailer vehicle tongue, and ball hitch components thereon;

Figure 2 is a top plan view of Figure 1;

Figure 3 is a vertical transverse section taken on the line 3—3 of Figure 1;

Figure 4 is a front perspective view, on a reduced scale, of the chain locking bracket of Figures 1 to 3;

Figure 5 is a front perspective view of another form of chain locking bracket in association with a tractor vehicle drawbar, shown in phantom lines; and Figure 6 is a vertical transverse section, similar to Figure 3, involving the chain locking bracket of Figure 5.

Referring in detail to the drawings, wherein like and related numerals designate like parts throughout the several views, and first to Figures 1 to 4, the numeral 10 designates a tractor vehicle drawbar, located beneath and projecting rearwardly beyond a bumper bar 12 and having on its rear end an upstanding hitch component in the form of a ball 14. Projecting forwardly from a trailer vehicle (not shown) is a tongue 16, here shown as being of inverted channel form and having a web 18 from which depend side flanges 20, to which are suitably secured, as by weldings 22, the rearwardly projecting side flanges 24 of a tractor hitch component, as a socket 26, which is releasably and lockably engaged over the hitch ball 14. The foregoing hitch structure is substantially conventional, and is subject to variation, and forms no part of the present invention, except in cooperative association of a safety chain assembly, consisting of a trailer vehicle tongue mounted chain locking bracket 28 and a safety chain 30.

The chain anchoring bracket 28 comprises a relatively narrow, and preferably rectangular and flat base plate 32, which is elongated transversely of and reaches at its ends beyond opposite sides of a trailer vehicle tongue 16 on which the bracket is secured. The base plate 32 is centrally secured, as by means of a pair of bolts 34, extending through the plate 32 and the tongue web 18, upon the top of the web 18. Fixed on and extending along the rear edge of the base plate 32, is a preferably integral upstanding anchoring flange 36 which terminates at its free upper edge in a rearwardly directed chain abutment lip 38. Formed in the lip 38 and in the body of the flange 36 at locations near the ends thereof are vertical, relatively narrow chain-locking slots 40, which are deeper than the maximum width of links but not substantially wider than the thickness of links, of the chain 30 hereinafter described.

Fixed on and extending along the forward edge of the base plate 32, as by weldings 42, is an inverted U-shaped chain retainer 44, preferably in the form of a loop of rounded rod, having a straight narrow bight portion 46 and legs 48. The bight portion 46 is spaced parallel from the base plate 32 at a height thereabove below the upper edge of the chain locking flange 36 and the abutment lip 38. As shown in the drawings, the anchoring bracket 28 is located behind and spaced from the hitch locking element 50 on the trailer vehicle hitch socket component 26.

The safety chain 30 comprises a plurality of interengaged and preferably uniform or similar elongated oval links 52 having parallel spaced straight side members 54 and arcuate end members 56, alternate links 52 being disposed substantially at right angles to each other. The chain 30 is long enough to have a midportion looped freely over and around a tractor vehicle drawbar 10, in front of and in pulling engagement with the front side of the bumper bar 12, as indicated at 53, and side portions 55 extending rearwardly from the bumper bar 12 beyond the chain anchoring bracket 28, with the side portions 55 preferably crossed beneath the drawbar, as shown in Figures 1 and 2.

The chain 30 is lockingly engaged with the anchoring bracket 28 by passing the side portions 55 rearwardly through and between the base plate 32 and the chain retainer 44, and then engaging vertical links, as indicated at 57, in the locking flange slots 40, with horizontal links, as indicated at 59, behind the flange 36 and beneath the abutment lip 38. These horizontal links 59, being wider than the slots 40, are thereby disposed to engage the undersides of portions of the lip 38 at opposite sides of the slots, so that the sides have some free movement in but are prevented from being jogged or otherwise accidentally displaced upwardly out of the slots. The location of the bight portion of the chain retainer 44 below the lip 38 also serves to limit upward working of links of the chain side portions 55 in the slots 40 and relative to the base plate 32, so as to further add to the securing of engagement of the chain side portions 55 with the anchoring bracket 28. On the other hand, the chain side portions 55 are easily and quickly disengageable from the anchoring bracket 28 by slackening the chain 30 so as to release the binding engagement of links with the bracket 28 and then lifting the vertical links 57 out of the slots 40.

The form of the invention shown in Figures 5 and 6, involves a differently constructed chain anchoring bracket 28a which is mounted beneath and along the side flanges 20a of a channel-shaped trailer vehicle tongue 16a and associated socket component 26a, instead of upon a trailer vehicle tongue, as in Figures 1 to 4.

The chain anchoring bracket 28a comprises a base plate 32a, similar to the base plate 32, Figures 1 to 4, on whose forward and rear edges are an upstanding chain retainer component 44a and an anchoring flange component 36a, respectively. In this instance, the chain retainer 44a instead of being a closed loop, is composed of two similar but reversed, inverted L-shaped elements whose horizontal arms 46a, which function like the bight portion 46 of the retainer 44, are spaced from each other, lengthwise of the base plate 32a. The place of the single anchoring flange 36 is here taken by a pair of anchoring flange elements 36a having abutment lips 38a on their upper ends, and are provided with vertical slots 40a. The anchoring flange elements 36a are spaced from each other lengthwise of the base plate 32a and are aligned with the arms 46a of the retainer elements. The spacings of the foregoing elements are such that, as shown in Figure 6, they are disposed against the side flanges 24a of a hitch socket component 26a, and suitably secured thereto, as by weldings 60, with the base plate 32a engaged with and suitably secured, as by weldings 62 and 64, to the lower edges of the hitch socket component flanges 24a and the trailer vehicle tongue side flanges 20a. The chain side portions 55a are engaged beneath the arms 46a of the elements of the chain retainer 44a and disposed in the slots of the anchoring flange elements 36a, as described in connection with the form of the invention shown in Figures 1 to 4.

Although there has been shown and described herein preferred forms of the invention, it is to be understood that the inventions are not necessarily confined thereto, and that any change or changes in the structures of and in the relative arrangements of components thereof are contemplated as being within the scope of the invention as defined by the claims appended hereto.

What is claimed is:

1. In combination, a tractor vehicle drawbar having a rear end, a bumper bar extending across the top of the drawbar behind the rear end, a tractor vehicle tongue having a forward end, a vertical axis hitch assembly swingably connecting the forward end of the tongue with the rear end of the drawbar, a chain anchoring bracket fixed to and upstanding from the tongue behind the forward end thereof, a chain having an intermediate portion and free end portions, said intermediate portion being loosely trained around the drawbar beneath the bumper bar, said free end portions being securably engaged with said bracket, said chain having vertical and horizontal links, said bracket comprising a base plate fixed upon the upper side of the tongue, upstanding anchoring flange means fixed on and extending across the base plate, said flange means having vertical slot means through which vertical links of the free end portions of the chain are releasably engaged, said base plate having upstanding chain retaining means fixed thereon in front of said flange means, said retaining means having horizontal arm means spaced upwardly from the base plate and bearing upon horizontal links of said free end portions of the chain.

2. In combination, a tractor vehicle drawbar having a rear end, a bumper bar extending across the top of the drawbar behind the rear end, a tractor vehicle tongue having a forward end, a vertical axis hitch assembly swingably connecting the forward end of the tongue with the rear end of the drawbar, a chain anchoring bracket fixed to and upstanding from the tongue behind the forward end thereof, a chain having an intermediate portion and free end portions, said intermediate portion being loosely trained around the drawbar beneath the bumper bar, said free end portions being securably engaged with said bracket, said chain having vertical and horizontal links, said bracket comprising a base plate fixed upon the upper side of the tongue, upstanding anchoring flange means fixed on and extending across the base plate, said flange means having vertical slot means through which vertical links of the free end portions of the chain are releasably engaged, said base plate having upstanding chain retaining means fixed thereon in front of said flange means, said retaining means having horizontal arm means spaced upwardly from the base plate and bearing upon horizontal links of said free end portions of the chain, said anchoring flange means consisting of a single flange and said slot means being a pair of slots spaced along the flange.

3. In combination, a tractor vehicle drawbar having a rear end, a bumper bar extending across the top of the drawbar behind the rear end, a tractor vehicle tongue having a forward end, a vertical axis hitch assembly swingably connecting the forward end of the tongue with the rear end of the drawbar, a chain anchoring bracket fixed to and upstanding from the tongue behind the forward end thereof, a chain having an intermediate portion and free end portions, said intermediate portion being loosely trained around the drawbar beneath the bumper bar, said free end portions being securably engaged with said bracket, said chain having vertical and horizontal links, said bracket comprising a base plate fixed upon the upper side of the tongue, upstanding anchoring flange means fixed on and extending across the base plate, said flange means having vertical slot means through which vertical links of the free end portions of the chain are releasably engaged, said base plate having upstanding chain retaining means fixed thereon in front of said flange means, said retaining means having horizontal arm means spaced upwardly from the base plate and bearing upon horizontal links of said free end portions of the chain, said anchoring flange means being two flanges spaced across the base plate and said slot means being a slot in each flange.

4. In combination, a tractor vehicle drawbar having a rear end, a bumper bar extending across the top of the drawbar behind the rear end, a tractor vehicle tongue having a forward end, a vertical axis hitch assembly swingably connecting the forward end of the tongue with the rear end of the drawbar, a chain anchoring bracket fixed to and upstanding from the tongue behind the forward end thereof, a chain having an intermediate portion and free end portions, said intermediate portion being loosely trained around the drawbar beneath the bumper bar, said free end portions being securably engaged with said bracket, said chain having vertical and horizontal links, said bracket comprising a base plate fixed upon the upper side of the tongue, upstanding anchoring flange means fixed on and extending across the base plate, said flange means having vertical slot means through which vertical links of the free end portions of the chain are releasably engaged, said base plate having upstanding chain retaining means fixed thereon in front of said flange means, said retaining means having horizontal arm means spaced upwardly from the base plate and bearing upon hoirzontal links of said free end portions of the chain, said arm means being a single arm.

5. In combination, a tractor vehicle drawbar having a rear end, a bumper bar extending across the top of the drawbar behind the rear end, a tractor vehicle tongue having a forward end, a vertical axis hitch assembly swingably connecting the forward end of the tongue with the rear end of the drawbar, a chain anchoring bracket fixed to and upstanding from the tongue behind the forward end thereof, a chain having an intermediate portion and free end portions, said intermediate portion being loosely trained around the drawbar beneath the bumper bar, said free end portions being securably engaged with said bracket, said chain having vertical and horizontal links, said bracket comprising a base plate fixed upon the upper side of the tongue, upstanding anchoring flange means fixed on and extending across the base plate, said flange means having vertical slot means through which vertical links of the free end portions of the chain are releasably engaged, said base plate having upstanding chain retaining means fixed thereon in front of said flange means, said retaining means having horizontal arm means spaced upwardly from the base plate and bearing upon horizontal links of said free end portions of the chain, said arm means being two arms spaced across the base plate.

References Cited in the file of this patent

UNITED STATES PATENTS

| | | |
|---|---|---|
| 1,117,930 | Turner | Nov. 17, 1914 |
| 2,196,115 | Jacobson | Apr. 2, 1940 |
| 2,788,990 | Barcafer | Apr. 16, 1957 |